United States Patent [19]

Campagnolo

[11] 4,135,727

[45] Jan. 23, 1979

[54] MOUNTING OF THE TRANSMISSION CHAIN OF BICYCLES

[76] Inventor: Tullio Campagnolo, Corso Padova 168, 36100 Vicenza, Italy

[21] Appl. No.: 739,143

[22] Filed: Nov. 5, 1976

[30] Foreign Application Priority Data

Jul. 6, 1976 [IT] Italy .............................. 25049 A/76

[51] Int. Cl.² .............................................. B62M 9/12
[52] U.S. Cl. .................................... 280/236; 74/217 B
[58] Field of Search .............. 280/236, 288, 261, 287, 280/289 R; 74/217 B, 611, 240, 230, 489

[56] References Cited

U.S. PATENT DOCUMENTS

| | | | |
|---|---|---|---|
| 592,987 | 11/1897 | Heminger | 74/611 |
| 2,959,069 | 11/1960 | Volhard | 74/611 |
| 3,840,251 | 10/1974 | Hautier | 74/217 B |
| 3,854,753 | 12/1974 | Hautier | 280/236 |
| 3,861,227 | 1/1975 | Hunt | 74/217 B |
| 3,972,247 | 8/1976 | Armstrong | 280/236 |

*Primary Examiner*—Kenneth H. Betts
*Attorney, Agent, or Firm*—Young & Thompson

[57] ABSTRACT

Improvements in the mounting of the transmission chain of bicycles for guiding and supporting the chain, comprising an arc-shaped guide applied on the inner side of the end of the rear fork of the bicycle, substantially concentric to the axis of the rear wheel of the bicycle itself, and mechanism for controlling the change-speed gear, which comprise a control lever rotatable with high friction into an appropriate seat of a clamp fixed to the front tube of the bicycle frame, to which lever is connected the change-speed gear control cable, a pawl mounted on said lever freely oscillating against the action of a spring, and a fixed stirrup associated with said seat and/or clamp. The pawl is adapted to cooperate with two ratchet gear teeth of the stirrup to permit movement of the chain to either an adjacent sprocket or to the guide.

2 Claims, 7 Drawing Figures

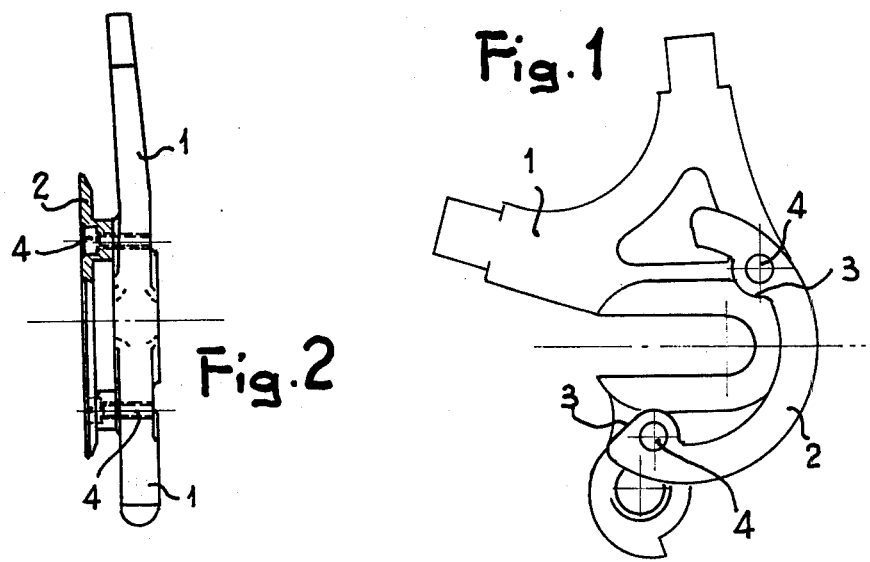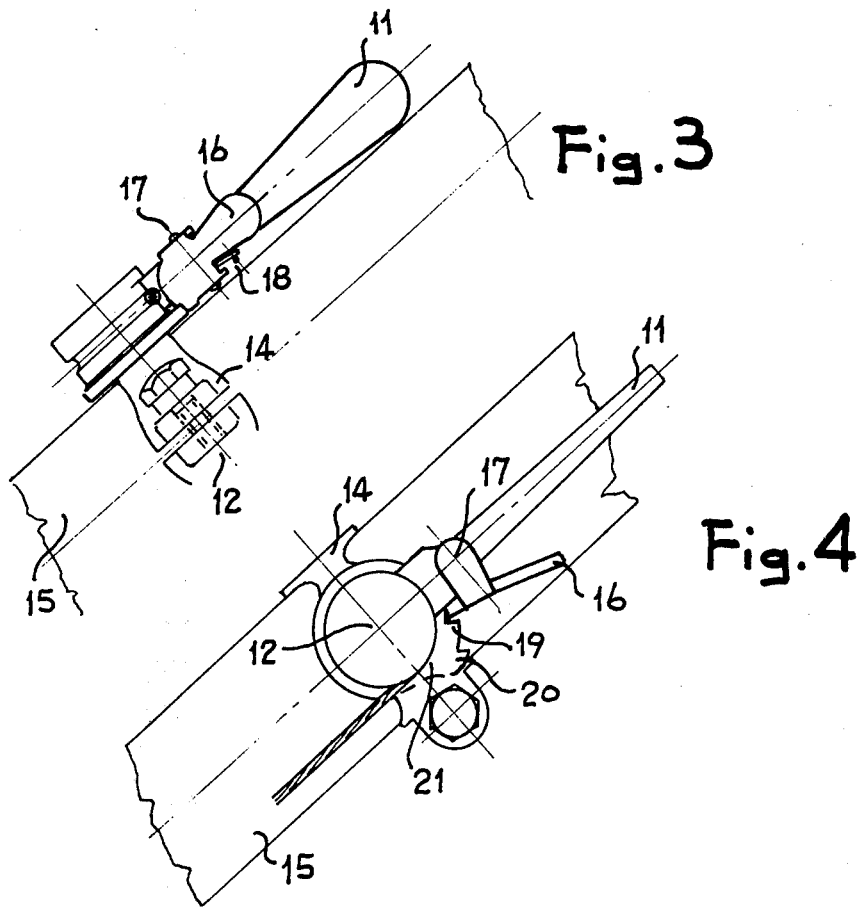

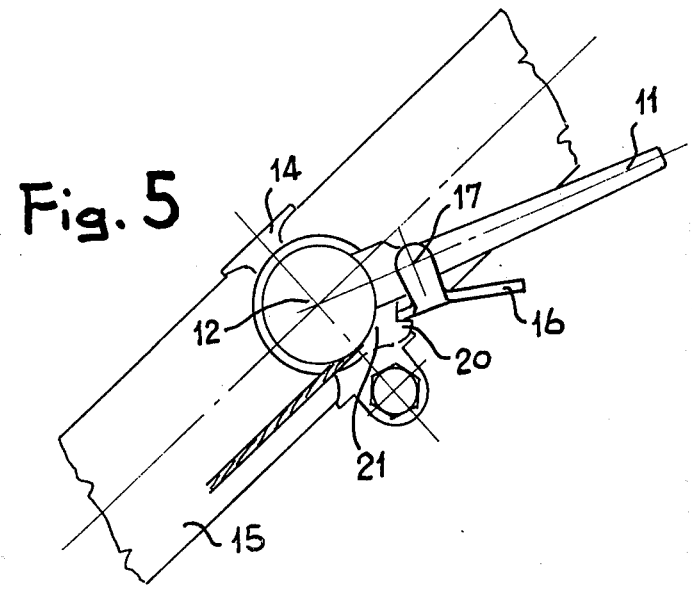
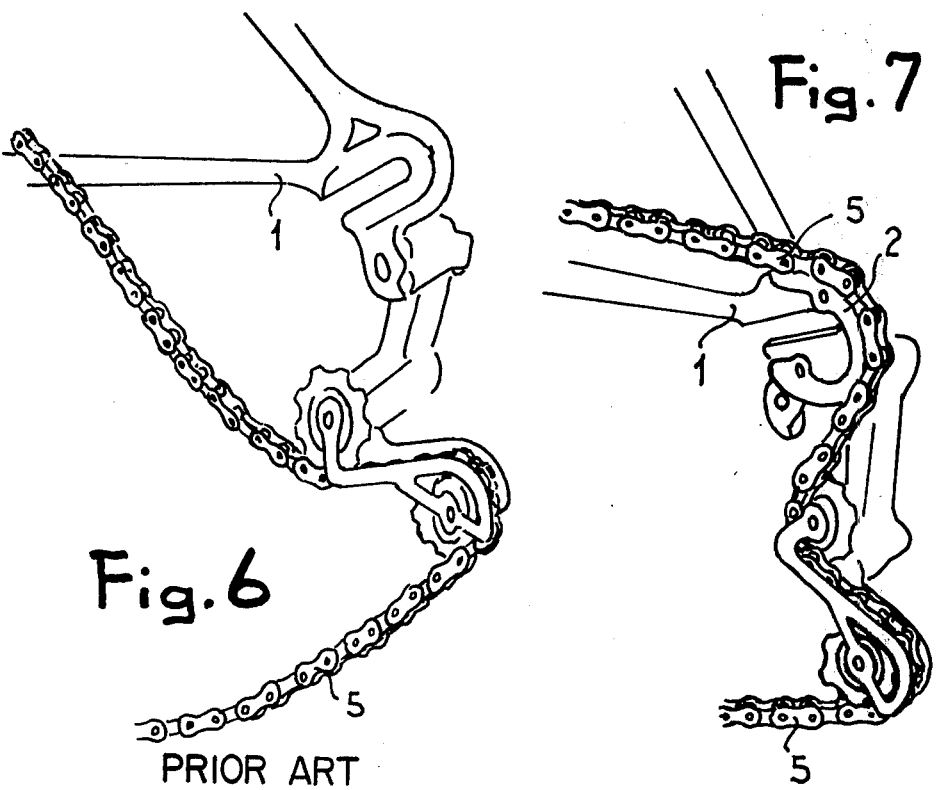

MOUNTING OF THE TRANSMISSION CHAIN OF BICYCLES

BACKGROUND OF THE INVENTION

The present invention relates to means for allowing the disengagement of the transmission chain of a bicycle from the sprockets of the free wheel of the rear wheel, and the support of the same chain in the stretched position, with the possibility to be easily applied again on said sprockets.

The object of the present invention is to facilitate the operations of mounting and removal of the rear wheel of a bicycle preventing, during removal, the total disorderly collapse of the rear part of the chain onto the derailleur of the speed-change gear and the difficulties in the subsequent mounting on the driving sprockets of the rear wheel. Such drawbacks are now present in all the bicycles and they are particularly felt by the cyclists who use their bicycle for sporting purposes or who actually take part in contests or races, but they also disturb the common user and the bicycle mechanic, who have to soil their hands, work hard and waste time on an operation which would be much simpler and quicker if it could be performed with the chain in a stretched position, anchored to the bicycle frame.

The above problem is very simply and efficiently solved by the present invention which provides, on the one hand, means for guiding and supporting the chain, associated to the frame and more precisely to the rear fork of the bicycle, and on the other hand, improved means for controlling the bicycle speed-change gear, in order to operate the deviation of the chain on said guiding and supporting means.

SUMMARY OF THE INVENTION

According to the invention, the chain guiding and supporting means are characterized in that they comprise an arc-shaped guide applied on the inner side of the end of the rear fork of the bicycle, substantially concentric to the axis of the rear wheel of the bicycle itself, while the change-speed gear control means — of the type comprising a control lever rotatable with high friction into an appropriate seat of a clamp fixed to the front tube of the bicycle frame, to which lever is connected the change-speed gear control cable — are characterized in that, on said lever is mounted a pawl freely oscillating against the action of a spring, and in that, to said seat and/or to said clamp is associated a fixed stirrup, said pawl being adopted to cooperate with two ratchet gear teeth of said stirrup.

Preferably, said guide is formed by an arc-shaped rail, fixed by two screws (or other means) to the fork, so as to be arranged parallel to the side of the outermost sprocket of the free wheel of the rear wheel, the diameter of said arc-shaped rail being smaller than the diameter of the rear wheel.

BRIEF DESCRIPTION OF THE DRAWINGS

The invention will now be described in further detail, by mere way of example, with reference to the accompanying drawings, which represents a preferred embodiment thereof and in which:

FIG. 1 is a side view of the guiding and supporting means according to the invention, of which FIG. 2 is a side view partly in cross section;

FIG. 3 is a plan view of the speed-change gear control means according to the invention, of which FIGS. 4 and 5 are side views in two different positions of use; and FIGS. 6 and 7 show, respectively, the structure with removed rear wheel of a conventional bicycle transmission, and of a bicycle transmission according to the present invention.

DESCRIPTION OF THE PREFERRED EMBODIMENT

With reference to FIGS. 1 and 2, to the rear fork 1 of a bicycle is applied — on the inner side of the end of its right arm — an arc-shaped rail 2, extending over and beyond a semicircle and being provided with two enlargements 3, forming seats to house screws 4, for the fixing to the fork 1 itself. The rail 2 forms an arc-shaped support guide, arranged parallel and substantially concentric to the sprockets of the free wheel of the bicycle rear wheel, to the side of the outermost and smallest of said sprockets.

As seen in FIG. 7, the transmission chain 5 of the bicycle (which normally, in any bicycle according to known technique, collapses and drops onto the ground when the rear wheel is removed, hence getting soiled or entangled, as shown in FIG. 6) can be deviated directly onto the arc-shaped rail 2 forming a guide, from the outermost and smallest sprockets of the free wheel of the rear wheel, before the latter is removed, so as to keep the chain perfectly stretched and in place on the bicycle frame during and after rear wheel removal.

To obtain the deviation of the chain 5 onto the guide rail 2, in the position of FIG. 7, use is made of the improved change-speed gear control means shown in FIGS. 3 to 5. Such means comprise a control lever 11 mounted rotatable with high friction about a pin 12, fixed to a clamp 14, adapted to be locked on the front tube 15 of the bicycle frame.

According to the invention, a pawl 16 is pivoted at 17 on the control lever 11, and is subject to the action of a spring 18, which normally keeps it in the position shown in the Figures, wherein it engages the teeth 19 or 20 of a stirrup 21 associated with the clamp 14.

In the position of FIG. 4 and in the positions obtained by rotating the lever 11 anticlockwise from said position, the lever 11 itself controls the speed-change gear in the usual manner. On the other hand, said lever cannot go beyond the position of FIG. 4, if one tries to rotate it clockwise, due to the engagement of the pawl 16 with the tooth 19.

If, however, the cyclist acts so as to cause the anticlockwise rotation of the pawl 16 about the pin 17, against the action of the spring 18, he can continue the rotation of the lever 11 beyond the tooth 19 (and up to when the pawl 16 engages the tooth 20). By such rotation, he operates the desired deviation of the chain onto the arc-shaped guide fixed to the rear fork of the bicycle, the rear wheel of which may thus be freely removed and remounted without any risk of the chain collapsing, getting entangled, damaged or soiled. To put back the bicycle in running conditions, it will then be sufficient for the cyclist to rotate the lever 11 anticlockwise, up to causing the pawl 16 to click beyond the tooth 19, so as to carry back the chain 5 from the idle condition of FIG. 7 to the normal working condition in engagement with the sprockets of the free wheel of the rear wheel.

Although the invention has been described with reference to a particular embodiment thereof, it is understood that other embodiments and modifications can be provided without thereby departing from the scope of the invention itself.

I claim:

1. In a bicycle having a frame having a rear fork on which is mounted the rear wheel of the bicycle, a plurality of speed change sprockets of different size concentric with the rear wheel, transmission chain that extends over said sprockets for driving the rear wheel of the bicycle, and speed change means for selectively moving said transmission chain from sprocket to sprocket thereby to alter the gear ratio of the bicycle; the improvement comprising a fixed arcuate support on the inner side of the end of the rear fork of the bicycle, substantially concentric with the axis of the rear wheel of the bicycle, and means for selectively moving the transmission chain from the sprocket adjacent said support onto said support in a position in which said chain extends about and rests on the arcuate outer surface of said support thereby to support said chain in a stretched position and to enable removal of the rear wheel and sprockets of the bicycle with the chain remaining in said supported position, said speed change means comprising a control lever mounted on the frame and rotatable among a plurality of positions to move said chain from sprocket to sprocket, said lever being movable into a further position beyond said plurality of positions to move said chain from said adjacent sprocket onto said support, a pawl mounted for oscillation on said lever, two ratchet gear teeth mounted on said frame, a spring urging said pawl into engagement with said teeth, one of said two teeth fixing the position of said lever in which said speed change means moves said chain only from sprocket to sprocket among said sprockets of different size, the other of said two teeth fixing a position of said lever in which said speed change means moves said chain between said adjacent sprocket and said support.

2. Structure as claimed in claim 1, in which said support comprises a curved rail fixed by a plurality of screws of said fork in a position parallel to the side of said adjacent sprocket.

* * * * *